(12) United States Patent
Falcon et al.

(10) Patent No.: US 11,809,973 B2
(45) Date of Patent: Nov. 7, 2023

(54) MODULARIZED MODEL INTERACTION SYSTEM AND METHOD

(71) Applicant: Grid.ai, Inc., New York, NY (US)

(72) Inventors: Williams Falcon, New York, NY (US); Adrian Walchli, Bern (CH); Thomas Henri Marceau Chaton, London (GB); Sean Presley Narenthiran, London (GB)

(73) Assignee: Grid.ai, Inc., New York, NY (US)

( * ) Notice: Subject to any disclaimer, the term of this patent is extended or adjusted under 35 U.S.C. 154(b) by 0 days.

(21) Appl. No.: 17/741,028

(22) Filed: May 10, 2022

(65) Prior Publication Data

US 2022/0269993 A1    Aug. 25, 2022

Related U.S. Application Data

(62) Division of application No. 17/405,888, filed on Aug. 18, 2021, now Pat. No. 11,361,253.

(60) Provisional application No. 63/166,629, filed on Mar. 26, 2021, provisional application No. 63/148,819, filed on Feb. 12, 2021, provisional application No. 63/067,203, filed on Aug. 18, 2020.

(51) Int. Cl.
  *G06F 9/46*    (2006.01)
  *G06N 20/00*    (2019.01)
  *G06F 9/50*    (2006.01)

(52) U.S. Cl.
  CPC ........... *G06N 20/00* (2019.01); *G06F 9/5005* (2013.01)

(58) Field of Classification Search
  CPC .................................................. G06F 9/5005
  See application file for complete search history.

(56) References Cited

U.S. PATENT DOCUMENTS

| | | |
|---|---|---|
| 2019/0156246 A1 | 5/2019 | Kuo et al. |
| 2019/0206020 A1 | 7/2019 | Ould-Ahmed-Vall et al. |
| 2019/0228261 A1 | 7/2019 | Chan |

*Primary Examiner* — Gregory A Kessler
(74) *Attorney, Agent, or Firm* — Jeffrey Schox; Diana Lin

(57) ABSTRACT

A modularized model interaction system and method of use, including an orchestrator, a set of hardware modules each including a standard set of hardware submodules with hardware-specific logic, and a set of model modules each including a standard set of model submodules with model-specific logic. In operation, the orchestrator determines a standard set of submodule calls to the standard submodules of a given hardware module and model module to implement model interaction on hardware associated with the hardware module.

7 Claims, 7 Drawing Sheets

MODULARIZED MODEL INTERACTION SYSTEM AND METHOD

CROSS-REFERENCE TO RELATED APPLICATIONS

This application is a divisional of U.S. application Ser. No. 17/405,888 filed 18 Aug. 2021, which claims the benefit of U.S. Provisional Application No. 63/067,203 filed 18 Aug. 2020, U.S. Provisional Application No. 63/148,819 filed 12 Feb. 2021, and U.S. Provisional Application No. 63/166,629 filed 26 Mar. 2021, each of which is incorporated in its entirety by this reference.

TECHNICAL FIELD

This invention relates generally to the machine learning field, and more specifically to a new and useful machine learning model interaction system and method in the machine learning field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
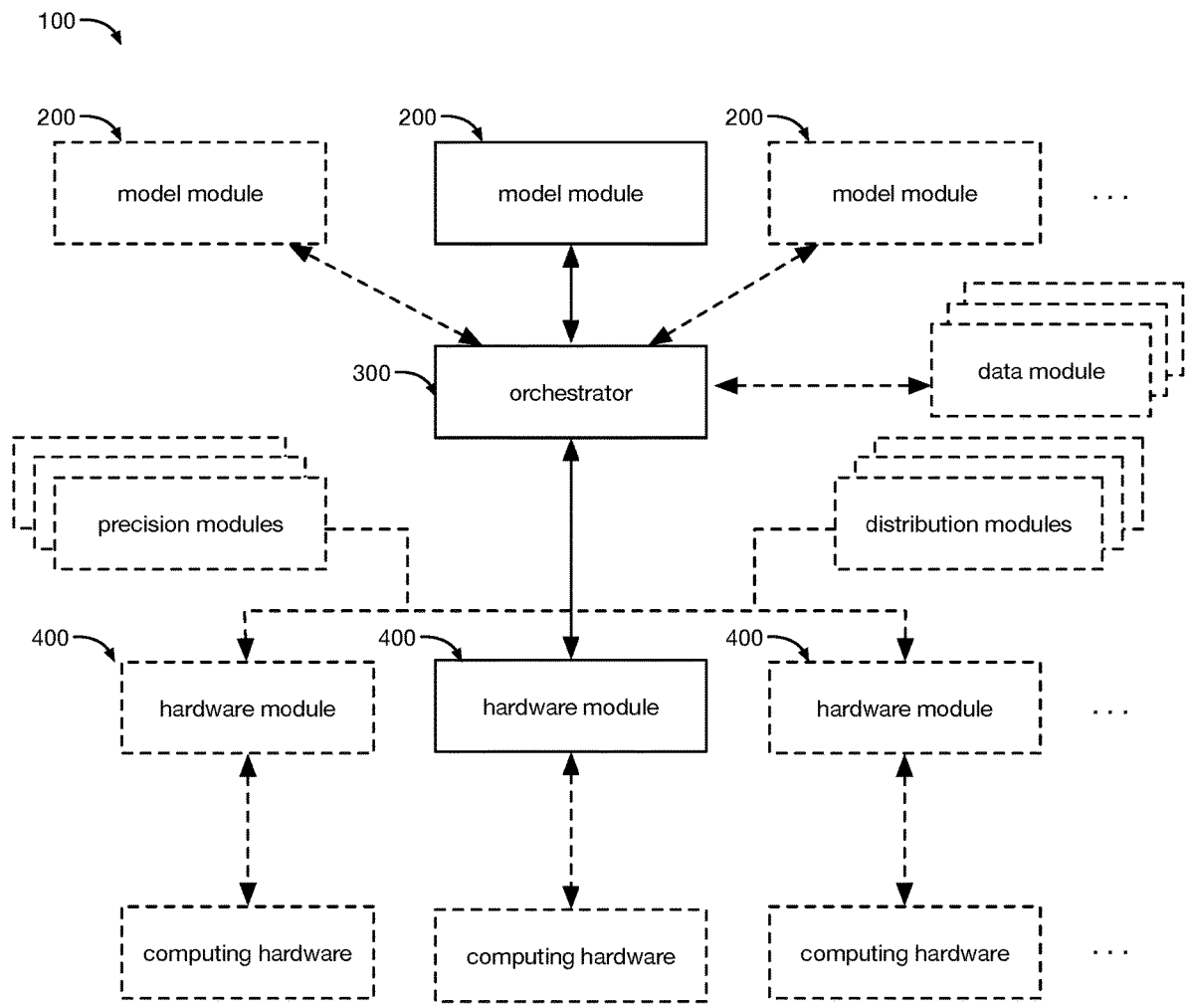
FIG. 1 is a schematic representation of a variant of a modularized model interaction system.

As shown in FIG. 1, the system includes an orchestrator 300 that interacts with a set of hardware modules 400 and a set of model modules 200. The system functions to decouple the code and logic for machine learning models from hardware logic. The system can additionally decouple the code and logic for orchestration from the machine learning models and the hardware logic.

Figure 2:
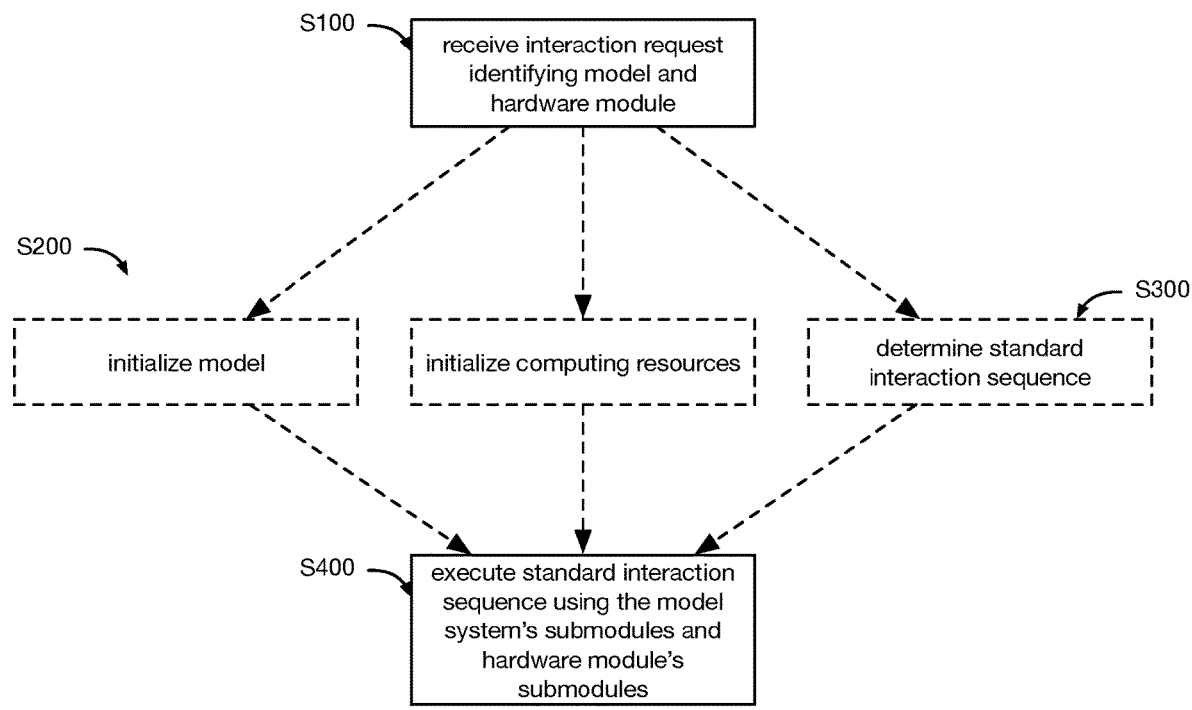
FIG. 2 is a schematic representation of a variant of a method of model interaction.

As shown in FIG. 2, a method for modular model interaction can include: receiving a model interaction request identifying a model S100; optionally initializing an instance of the model and an instance of a computing resource using an associated model module and hardware module S200; optionally determining a standard interaction sequence associated with the requested interaction S300; and executing model- and hardware-specific logic by executing standard submodules of the model module and hardware module based on the standard interaction sequence (e.g., using the standard names) S400. Examples of model interaction can include: training, validation, testing, predicting, and/or other model interactions.

This modularized architecture can confer several benefits over conventional systems.

First, the architecture can enable different model-hardware permutations to be quickly and easily created and used, without requiring model developers to support each and every piece of hardware that an end user could potentially use with their model. This allows each model to be extensible to both current and future hardware types, without much, if any, change to the model itself. Furthermore, this allows results to be more easily reproduced, allows the training loop and tricky engineering to be automated, and allows the model to be scalable to any hardware without changing the model.

Second, the architecture can enable research-grade models to be used in production, since the models no longer need to be rewritten to accommodate production-level hardware deployments. Research-grade models also no longer need to be rewritten to be compatible with other production code, since the research-grade model logic can be wrapped under the relevant standard submodule and referenced using a standard name (e.g., reserved name).

Third, variants of the system can be further modularized, and decouple data precision logic, scaling logic, clustering logic, and/or other logic from the hardware logic. This level of modularization can enable the existing hardware logic to be extensible to new types of data precision, scaling schemes, or clustering schemes, without requiring hardware logic updates to support new functionality.

Figure 4:
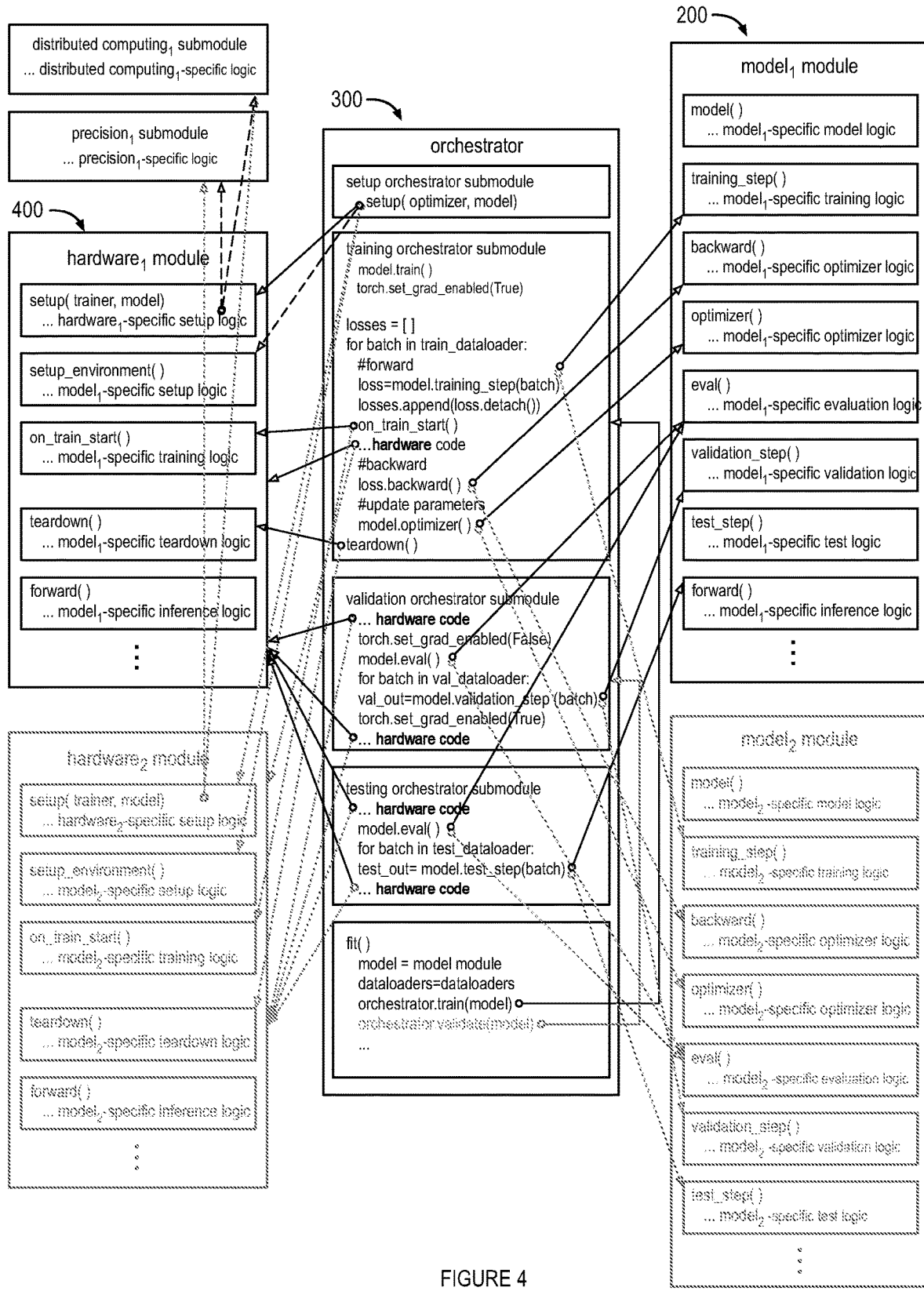
FIG. 4 is a schematic representation of an example of hardware modules, model modules, and an orchestrator, each with the submodules, wherein the submodules of the hardware modules and model modules are each identified by reserved names and have hardware- and model-specific logic, respectively.

In one example (e.g., examples shown in FIG. 1 and FIG. 4), the system 100 can include a set of machine learning model modules (e.g., LightningModule™), wherein each model module can include at least a minimum set of submodules, each referenced by a standard name (e.g., reserved name), but include model-specific logic. The system can also include a set of hardware modules (e.g., "accelerator"), each configured to interact with a different computing resource, wherein each hardware module can also include at least a minimum set of submodules, each referenced by a standard name (e.g., reserved name), but include hardware-specific logic (e.g., required to initialize, load, configure, coordinate, and/or otherwise interact with a specific hardware class or type). The orchestrator (e.g., "trainer," "orchestrator"), which is generic to all custom models and computing resources, can then selectively execute a predefined series of submodules to implement a requested interaction with the model on the computing resource. For example, the orchestrator can define a training loop that iteratively calls a training series of submodules, wherein each submodule call executes the model- or hardware-specific logic identified by the submodule's standard name within the model module or hardware module. In specific examples, users can implement or modify the model modules, and can optionally implement or modify custom hardware modules, loops, and/or precision modules. In these specific examples, users cannot modify the orchestrator.

However, the system can otherwise enable model development to be decoupled from hardware support.

The system 100 can be used with a set of model modules 200, which functions to make each model self-contained, modular, reusable (e.g., sharable without modification), and extensible to different types of hardware (e.g., without modification). Additionally or alternatively, each model module can define a system. Each model module includes model-specific logic for different model functionalities (e.g., submodules), and can exclude hardware logic and/or orchestration logic. Each model module (e.g., LightningModule™) is preferably custom and developed by a model developer, but can alternatively be generic.

Figure 3A:
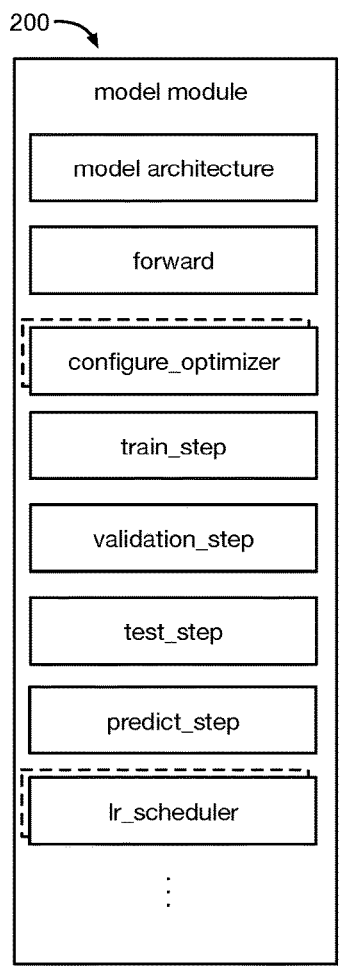
FIGS. 3A, 3B, and 3C are illustrative examples of a model module, hardware module, and orchestrator, respectively.

Each model module can include a set of model submodules (example shown in FIG. 3A). Each model module preferably includes the same set of basic submodules (e.g., model submodule, train submodule, validation submodule, testing submodule, prediction submodule, optimizer submodule, etc.), but can include additional submodules or different submodules.

Each model submodule is preferably referenced by a standard name (e.g., reserved name). The reserved name for a given submodule type (e.g., model submodule, train submodule, optimizer submodule, etc.) is preferably the same across different modules (e.g., different modules for different ML models), but can alternatively be different. For example, the same "training_step" call can reference the respective training submodules in an autoencoder model module and a Seq2Seq model module.

Each model submodule can include the code or logic for a specific functionality (e.g., the model interaction, the functionality for the submodule type), wherein the logic represented by the code can be specific to the model module (e.g., specific to the ML model supported by the model module), or be generic (e.g., shared) across model modules. For example, each model submodule can include model- and interaction-specific logic. Each submodule preferably excludes hardware-specific and/or orchestration-specific code, but can alternatively include hardware- or orchestration-specific code. Each submodule can optionally function as and/or enable a set of predefined, standard hooks for the respective submodule type, wherein the hooks can execute model-specific code when called. Each submodule of a given type (e.g., across different modules) preferably accept the same set of inputs (e.g., required parameters, optional parameters, etc.), but can alternatively accept different input types.

The set of submodules can include: the model submodule; an optimizer submodule; and a set of interaction submodules, but can additionally or alternatively include other submodules.

The model submodule of the model module functions to define the model computations and/or model architecture. The model submodule can define the logic for one or more models. The model submodule is preferably referenced (e.g., called) by using a reserved name (e.g., standard name), such as "init" or "model," but can be otherwise referenced. The model submodule can include the computations (e.g., logic, code) for a single machine learning model, but can alternatively include the logic for multiple machine learning models (e.g., for a system of models, for an ensemble of models, for a cascade of models, etc.). The model computations can be defined directly in the model submodule, or be retrieved from a third party resource (e.g., via a URI, an API call, etc.). The model submodule can optionally receive model parameters (e.g., dimensions, generator, discriminator, etc.), but can receive no parameters or other parameters.

Examples of machine learning models (ML models) that can be enabled by the model submodule can include: computer vision models, natural language processing (NLP) models, text-to-speech (TIS) models, medical imaging models, CNNs, DNNs, GANs, regression models, classification models, clustering models, and/or other models. Specific ML models can include: autoencoders, BERT, DQN, GAN, image classifiers, Seq2Seq, SimCLR, VAE, and/or other models.

The optimizer submodule of the model module functions to define which optimizers and/or learning-rate (LR) schedulers to use for the model (if any), and/or define optimizers and/or LR schedulers specific to the model (e.g., computations) supported by the shared model module. The optimizer submodule is preferably referenced (e.g., called) by using a reserved name (e.g., standard name), such as "optimizer" or "configure_optimizers," but can be otherwise referenced. The optimizer submodule can define the logic for optimizing the trained model (e.g., for one or more optimization methods), clearing the gradients from prior interaction steps (e.g., training steps), the backward pass, model parameter updating, and/or other functionalities. The optimizer submodule can directly define the optimizer logic, or can reference another source, such as an optimizer module (e.g., from a set of optimizer modules of the system), a third party source (e.g., via an API, a URI, etc.), and/or any other suitable source. The optimizer submodule is preferably configured to receive the model, but can receive other parameters. However, the test submodule can be otherwise defined.

The set of interaction submodules function to define interaction-specific logic for the model. Each interaction submodule can define the logic for a single interaction epoch or interaction loop iteration, but can alternatively define logic for an entire interaction loop or sequence, or define other logic. The set of interaction submodules can include a train submodule; a validation submodule; a test submodule; an optional forward submodule (e.g., for inference, prediction, production, etc.); and/or other submodule types.

The train submodule of the model module functions to define a training loop (or training step) specific to the model (e.g., the computations) supported by the shared model module. The train submodule is preferably referenced (e.g., called) by using a reserved name (e.g., standard name), such as "training_step" (e.g., model.training_step( )), but can be otherwise referenced. The train submodule preferably defines the full training logic (e.g., to train the respective model) for a single training epoch or loop iteration, but can alternatively define the full training logic for the entire training loop, or for any other suitable portion of the training process. The train submodule can define the logic for computing and returning the training loss, metrics (e.g., for a progress bar or logger), and/or other functionalities. The train submodule can receive the training data (e.g., inputs, targets, batch, etc.), the training data identifier (e.g., batch index), the optimizer index, hidden tensors, and/or other parameters. In a specific example, the train submodule can include the logic to perform one or more forward passes and calculate the loss for a batch. In a specific example, the train submodule can include the training logic from a standard Pytorch™.forward( ) function. However, the train submodule can be otherwise defined.

The optional validation submodule of the model module functions to define a validation loop (or validation step) specific to the model (e.g., computations) supported by the shared model module. The validation submodule is preferably referenced (e.g., called) by using a reserved name (e.g., standard name), such as "validation_step" (e.g., "model.validation_step( )") but can be otherwise referenced. The validation submodule can define the logic for validating the trained model, such as example generation, calculating metrics (e.g., accuracy, precision, recall, etc.), and/or other functionalities. The validation submodule preferably defines the full validation logic (e.g., to validate the respective model) for a single validation epoch or iteration, but can alternatively define the full validation logic for an entire validation loop, or for any other suitable portion of the validation process. The validation submodule can be configured to receive validation data (e.g., inputs, targets, etc.), the validation data identifier (e.g., batch index, dataloader index, etc., and/or other parameters. The validation submodule is preferably configured to operate on a single batch of data (e.g., from a validation set), but can alternatively operate on multiple batches, a single datum, and/or other sets of data. In a specific example, the validation submodule can include the validation logic from a standard Pytorch™.forward( ) function. However, the validation submodule can be otherwise defined.

The optional test submodule of the model module functions to define a test loop (or test step) specific to the model (e.g., computations) supported by the shared model module. The test submodule is preferably referenced (e.g., called) by using a reserved name (e.g., standard name), such as "test_step" (e.g., "model.test( )"), but can be otherwise referenced. The test submodule can define the logic for testing the trained model, such as loading the best weights for the model (e.g., post-training) and running the trained model on test data (e.g., received from the user), and/or other functionalities. The test submodule preferably defines the full test logic (e.g., to test the respective model) for a single test epoch or iteration, but can alternatively define the full test logic for an entire test loop, or for any other suitable portion of the test process. The test submodule can be configured to receive the model, the test data, the test data identifier (e.g., batch index, dataloader index, etc.), and/or other parameters. In a specific example, the test submodule can include the test logic from a standard Pytorch™.forward( ) function. However, the test submodule can be otherwise defined.

The optional forward submodule (prediction submodule) of the model module functions to define the inference procedure specific to the model (e.g., operations used for prediction, logic for a forward pass, etc.). The forward submodule is preferably referenced (e.g., called) by using a reserved name (e.g., standard name), such as "forward" or "infer," but can be otherwise referenced. The forward submodule can be configured to receive the model, the inference data, and/or other parameters. In a specific example, the forward submodule can include the logic from a standard Pytorch™ torch.nn.Module.forward( ) function. However, the forward submodule can be otherwise defined.

The optional prediction submodule of the model module functions to define a prediction loop specific to the model (e.g., computations) supported by the shared model module. The prediction submodule is preferably referenced (e.g., called) by using a reserved name (e.g., standard name), such as "predict_step" (e.g., "model.predict_step( )") but can be otherwise referenced. The prediction submodule can define the logic for validating the trained model, such as example generation, calculating metrics (e.g., accuracy, precision, recall, etc.), and/or other functionalities. The prediction submodule preferably defines the full prediction logic (e.g., to validate the respective model) for a single prediction epoch or iteration, but can alternatively define the full prediction logic for an entire prediction loop, or for any other suitable portion of the prediction process. The prediction submodule can be configured to receive prediction data (e.g., inputs, targets, etc.), the prediction data identifier (e.g., batch index, dataloader index, etc., and/or other parameters. The prediction submodule is preferably configured to operate on a single batch of data (e.g., from a validation set), but can alternatively operate on multiple batches, a single datum, and/or other sets of data. However, the prediction submodule can be otherwise defined.

The model module can optionally include other submodules. Examples of other submodules can include: a test step end submodule defining functionalities performed at the end of a test step (e.g., called using "test_step_end" or another reserved name; for aggregating data across batches from data split across different GPUs for processing at the main GPU, etc.); a test epoch end submodule defining functionalities performed at the end of a test epoch (e.g., called using "test_epoch_end" or another reserved name; for aggregating the output of all test steps, etc.); a training step end submodule defining functionalities performed at the end of a training step (e.g., called using "training_step_end" or another reserved name; for aggregating data across batches from data split across different GPUs for processing at the main GPU, etc.); a training epoch end submodule defining functionalities performed at the end of a training epoch (e.g., called using "training_epoch_end" or another reserved name; for aggregating the output of all training steps, etc.); a validation step end submodule defining functionalities performed at the end of a validation step (e.g., called using "validation_step_end" or another reserved name; for aggregating data across batches from data split across different GPUs for processing at the main GPU, etc.); a validation epoch end submodule defining functionalities performed at the end of a training epoch (e.g., called using "validation_epoch_end" or another reserved name; for aggregating the output of all training steps, etc.); a callback configuration submodule defining model-specific callbacks (e.g., called using "configure_callbacks," etc.); a freeze submodule defining the logic to freeze all model parameters (e.g., called using "freeze," to freeze model parameters for inference; etc.); a log submodule defining the logic for saving or logging values (e.g., metrics, data values, parameters, etc.; called using "log," etc.;); a hyperparameter submodule defining the logic for returning, specifying, and/or saving hyperparameters (e.g., called using "hparams," etc.); format submodules defining the logic for conversion to and/or saving as different storage formats; a write submodule defining logic for writing predictions to storage (e.g., called using "write_prediction"; using standard library save calls, such as torch.save( )); and/or other submodules. Additionally or alternatively, the aforementioned submodule functions can be handled by callbacks, be wrapped into other submodules (e.g., prediction writing or storage can be included into the prediction submodule; artifact writing or storage can be included in the training submodule, etc.), or be otherwise organized.

However, the model module can be otherwise constructed.

The orchestrator 300 of the system 100 functions to coordinate interaction between one or more model modules, hardware modules, and/or other modules. In examples, the orchestrator determines and controls execution of a standard set of submodule calls (e.g., orchestration logic, interaction logic) to the standard submodules of a given hardware module and model module to implement model interaction on hardware associated with the hardware module. The standard set of submodule calls can be called: contemporaneously (e.g., in parallel), concurrently, serially (e.g., be a series of standard submodules), and/or in any other suitable order.

The model modules and hardware modules can be specified by a user, automatically determined (e.g., based on a problem specification, such as automatically selecting a CCN for an image analysis problem), and/or otherwise determined. By abstracting out the model-hardware interactions into a separate orchestrator, the system enables any model to be trained and executed on arbitrary hardware, without requiring any code changes. For example, the orchestrator can: set up the hardware for the execution instance (e.g., initialize and set up the coordination between a specified number of hardware instances, load the correct hardware module, configure the hardware to accommodate a specified precision, etc.); automatically enable and/or disable gradients; run the training, validation, and test dataloaders; call auxiliary functions (e.g., "callbacks"; non-model, non-hardware, and/or non-orchestration logic) at the appropriate times; initiate requests for batches and computations on the correct hardware modules (e.g., wherein the hardware modules then put the batches and/or computations on the correct hardware instances by calling hardware-specific functions); automatically iterate through interaction epochs and batches; automatically call optimizer.step( ), backward, zero_grad( ); automatically evaluate (e.g., call .eval( )) and enable/disable grads; automatically load weights; automatically log model artifacts; and/or perform other functionalities for arbitrary hardware and/or models, by calling the standard submodules (e.g., standard functions, reserved names, etc.) of the respective modules (example shown in FIG. 5).

The orchestrator is preferably standardized and generic, such that the system preferably includes a single orchestrator (e.g., one or more instances of the same orchestrator) for all modules and all hardware modules. However, the system can alternatively include multiple orchestrators (e.g., for different interactions, different interaction classes, different modules, different hardware, different orchestration schemes, etc.).

The orchestrator preferably includes all the interaction orchestration logic (e.g., when to call which standard submodules from the specified hardware module and/or specified model module), and no model-specific code or hardware-specific code. The standardized orchestration logic preferably calls standardized reserved functions (e.g., reserved names) of the model modules and/or hardware modules, but can alternatively call custom names. However, the orchestrator can additionally or alternatively include: model specific code, hardware-specific code (e.g., accessed when the relevant hardware is specified in a request), and/or other logic.

Figure 3B:
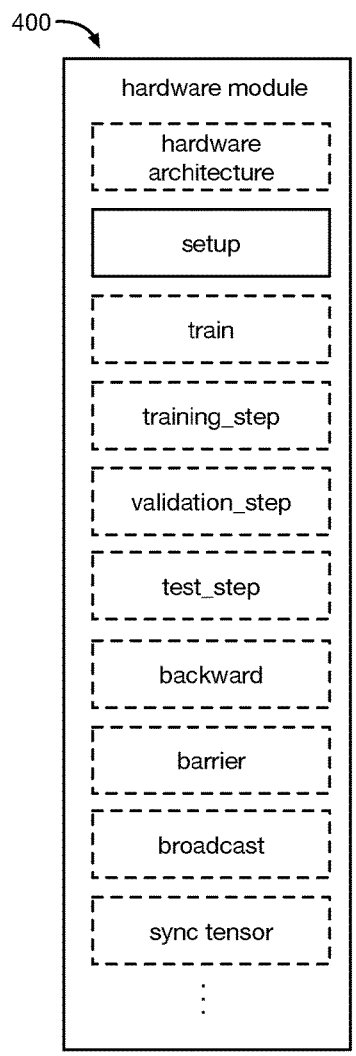
Figure 3C:
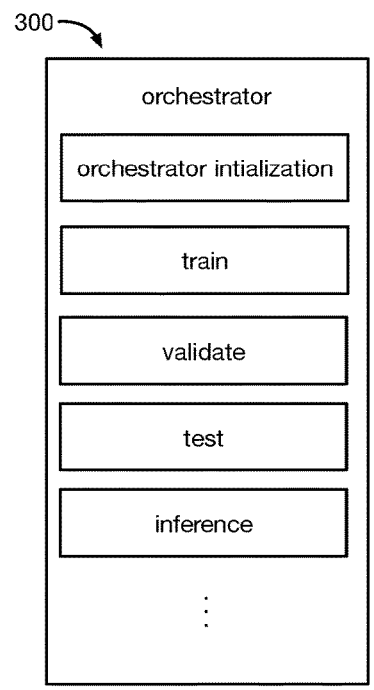

The orchestrator preferably defines orchestration logic for different interactions in different orchestration submodules (example shown in FIG. 3C), but can alternatively define the orchestration logic for one or more interactions in a single module.

Examples of orchestrator submodules can include: a fine tuning submodule that coordinates model parameter fine tuning; a fit submodule; a prediction submodule that coordinates inference (e.g., by calling the model module's forward submodule); a test submodule that coordinates testing (e.g., by calling the model module's test submodule); a validation submodule that validates the model against a validation dataset; a hardware initialization submodule that initializes the hardware (e.g., in a target duster environment, with a user-defined precision, etc.); a hardware teardown submodule that shuts down the hardware instance(s); and/or other submodules. However, one or more of the aforementioned submodules can be higher-level modules of the overall system. Each submodule's orchestration logic is preferably generic and shared across different models and/or hardware, but can alternatively be hardware-specific, model-specific, hardware class-specific, model class-specific, and/or otherwise specialized.

Each orchestrator submodule preferably calls the reserved functions (e.g., reserved names) of a model module and/or hardware module, but can additionally or alternatively call any other suitable set of functions, hooks, names, or other references. Each orchestrator submodule preferably calls the reserved functions in a predetermined order, but can alternatively call the reserved functions in any other suitable order. For example, a train orchestrator submodule can execute the same set of model subfunctions in the same order for all model modules.

Each orchestrator submodule preferably initiate, advance, or terminate the run responsive to a generic condition being met (e.g., wherein the advance or termination condition can be shared across all or most models for the given interaction), but can alternatively be initiate, advanced, or terminated responsive to a model-specific condition being met (e.g., wherein the model-specific condition can be defined by the model module or by a model-specific orchestrator submodule).

Each orchestrator submodule can include looping logic (e.g., standardized looping logic), sequential logic, and/or other logic. When the orchestrator submodule includes a loop, the reserved functions called by the orchestrator submodule are preferably for a single looping epoch (e.g., "train_step( )", "validation_step( )", etc.), wherein the looping logic is handled by the orchestrator (e.g., when to run, when to advance, when to terminate). However, the reserved functions can alternatively include the looping logic.

In a first variation, each orchestration submodule includes the full orchestration logic for each hardware and/or model interaction. For example, the training orchestration submodule can directly: place the model in the correct model interaction mode (e.g., by calling model.train( ), model.validate( ), model.test( ), model.predict( ), etc.); load the relevant data (e.g., training data, validation data, test data, prediction data, etc.); call the model module's submodules in a predetermined order; determine when the model interaction is completed (e.g., detect a completion condition); and terminate the run.

In a second variation, the orchestration logic (e.g., looping logic) for each hardware and/or model interaction (e.g., train, validate, test, predict, etc.) can be a higher-level set of logic that is generic to and calls subfunctions of the orchestration submodules. In this variation, each orchestration submodule can include a set of model- and/or hardware-interaction-specific logic, specific to the respective model- and/or hardware interaction, that is associated with a predetermined reserved function name (e.g., reserved orchestration function, reserved orchestration name, etc.). In other words, the same reserved orchestration function can map to different orchestration logic within different orchestration modules. Each different set of orchestration logic, in turn, can call a predetermined set of reserved hardware functions and/or reserved model functions, which, in turn, can map to different hardware- and/or model-specific implementation logic within the respective hardware module and/or model module.

For example, the orchestration logic can initialize a run by calling a run initialization function (e.g., "on_run_start( )") from the orchestration submodule; iteratively call an iteration initialization function (e.g., "on_advance_start( )"), an advance function (e.g., "advance( )"), and an iteration termination function (e.g., "on_advance_end") from the orchestration submodule; call a completion condition from the orchestration submodule (e.g., "done( )"); evaluate whether a completion condition is unmet (e.g., "while not done( )") and continue iteration if unmet; and call a run termination function (e.g., "on_run_end( )"), from the orchestration submodule, when the completion condition is met. In an illustrative example, "advance( )" can map to a call to a model's "training_step( )" within an orchestrator training submodule, map to a call to a model's "validation_step( )" within an orchestrator validation submodule, map to a call to a model's "testing_step( )" within an orchestrator testing submodule, and map to a call to a model's "forward ( )" within an orchestrator prediction submodule. However, the orchestration submodules can additionally or alternatively include orchestration logic for: checkpoint saving (e.g., "on_save_checkpoint( )"); load checkpoints (e.g., "on_load_checkpoint( )"), which can receive a computational or loop state (e.g., "state_dict") as an argument); loop and/or children state loading (e.g., "load_state_dict( )"); connect one or more loops to a given loop (e.g., "connect ( )"); skip the loop or iteration (e.g., "skip( )"); specify logic for when the loop or iteration is skipped (e.g., "on_skip( )"); reset the internal loop state (e.g., "reset( )"); and/or include logic for any other suitable loop interface function or name. However, the orchestration logic can be otherwise arranged and distributed.

The orchestrator can additionally or alternatively include hardware initialization logic. The hardware initialization logic is preferably generic across all hardware classes, distribution types (e.g., scaling type), precisions, and multiplicities, but can alternatively be specific to hardware class, distribution type, precision, multiplicity, and/or other hardware parameter.

In a first variation, the hardware initialization logic of the orchestrator includes logic for all hardware parameter permutations (e.g., in one or more if( ) statements).

In a second variation, the hardware initialization logic of the orchestrator includes a series of generic calls (e.g., using reserved function names) to one or more of a set of hardware parameter submodules. The hardware parameter submodules are preferably independent of the hardware modules, but can alternatively be defined as part of the hardware modules. The hardware parameter submodules are preferably generic (e.g., shared) across different hardware classes and/or hardware modules, but can alternatively be specific to a hardware module and/or hardware class.

The set of hardware parameter submodules can include: a set of precision modules, a set of distribution modules, and/or any other suitable set of submodules. The hardware parameter submodules can be: loaded into or connected to the orchestration instance during orchestrator setup; loaded into or connected to the hardware module instance during orchestrator setup; used to configure the hardware during hardware initialization; and/or otherwise used.

The precision modules function to define the logic for precision-specific parts of model interaction (e.g., specify the logic for handling precision-specific parts of each interaction). The precision modules (e.g., "precision plugins", precision submodules, data precision module, etc.) can be used for pre- and post backward/optimizer step operations (e.g., scaling gradients); provide context managers for forward( ), training_step( ), or other functions; be used for gradient dipping; and/or otherwise used. Each precision module preferably enables a different data precision type (e.g., for any hardware, for a specific hardware class, for a specific hardware make and model, etc.), but can alternatively be hardware-specific or otherwise configured. Each precision module can include at least the same set of reserved names (reserved precision names) that the accelerator, orchestrator, other functions of the precision module, and/or other modules can call, wherein each reserved name can be associated with a set of precision-specific logic.

The precision modules can define: the backend to use for said precision (e.g., AMFType.NATIVE, AMPType.APEX, etc.), the backend parameters to use for said precision (e.g., amp_level), the scaler to use for said precision (e.g., torch.cuda.amp.GradScaler( )), the scheduler to use for said precision, the optimizer to use for said precision, define the series of backend-specific, model-specific, hardware-specific, scheduler-specific, optimizer-specific, and/or scaler-specific function calls to use for each interaction step (e.g., generic interaction step), the datatypes to use (e.g., tensor, int, float, etc.), define how the precision module should be connected to the model modules (e.g., how the model should be transformed), orchestrator, and/or hardware modules, and/or define other functionalities.

Examples of precisions that can be used include: 16-bit precision, 32-bit precision, native mixed precision (e.g., torch.cuda.amp), native mixed precision training for external training libraries (e.g., Nvidia/Apex), mixed precision for sharded training, hardware-specific precision (e.g., mixed precision for Nvidia GPUs, mixed precision for Apex™ hardware, etc.), precision for DeepSpeed™ integration, bfloats (e.g., for TPUs), double precision (e.g., for double precision training, such as torch.float64), and/or other precisions.

The precision modules can define precision-specific logic for: the backward pass (e.g., "backward( )", gradient clipping (e.g., by norm or "clip_grad_by_norm", by value or "clip_grad_by_value", general clipping or "clip_gradients", etc.), connecting the precision module to the hardware module and/or orchestrator instance (e.g., "connect (model, optimizers, lr_schedulers)", etc.), returning the plain model parameters (e.g., "master_params"), logic to execute after backward execution (e.g., "post_backward"), logic to execute after each optimizer step (e.g., "post_optimizer_step"), logic to execute before backward execution (e.g., "pre_backward"), logic to execute before each optimizer step (e.g. "pre_optimizer_step"), and/or define logic for any other suitable functionality and/or reserved name.

The distribution modules (e.g., scaling submodules, training type submodules, "trainingtype plugins", distribution submodules, etc.) function to define the logic for different types of hardware coordination (e.g., different types of distributed hardware, different distributed computing types), and can change the behavior of the training, validation, test, and/or other interactions. The coordination is preferably between different hardware instances (e.g., inter-computing-resource coordination), but can additionally or alternatively be within the same hardware instance (e.g., intra-computing-resource coordination). Examples of coordination include: data allocation to different hardware instances (e.g., which data batch to load onto which hardware instance or computing resource), how model interaction (e.g., submodule execution) should be coordinated between different hardware instances, what information to communicate between hardware instances at what time, how to track tasks between hardware instances, when to spawn new hardware instances, when to terminate old hardware instances, which datatype to use, how to manage the datatype, and/or other coordination functionalities. In an illustrative example, the distributed GPU submodule can include logic for how to track tasks distributed across different GPUS, and manages CUDA tensors allocated on each device. In a specific example, the distributed GPU submodule includes and executes .cuda( ) and .to( ) calls (e.g., wherein these calls are excluded from the model modules).

The distribution modules can each define the same or different logic for training, validation, testing, and/or other model interactions and/or training phases. Each distribution module preferably enables a different type of distributed computing (e.g., for specific hardware classes, for any hardware class, for different model classes, for specific hardware makes and models, etc.), but can alternatively enable different coordination methods and/or other functionalities. Each distribution module can be specific to coordination method, a hardware class, a specific hardware make or model, a model class, a specific model, a combination thereof, be generic, or be otherwise shared or specific.

Each distribution module can include a set of reserved names (reserved distribution names; the same set of reserved names; etc.) that the accelerator, orchestrator, other functions of the distribution module, and/or other modules can call, wherein each reserved name can be associated with a set of distribution-specific logic.

The distribution modules can define: the list of parallel devices, the number of parallel devices, the cluster environment (e.g., specified by the distribution module, specified by an externally-provided duster environment identifier, etc.), the distribution-specific parameters (e.g., communication state, batchnorm, global rank, local rank, world size, world rank, etc.), and/or other parameters. The distribution modules can define logic for: a single computing resource, a data parallel architecture (DP), a distributed data parallel architecture (DDP), a sharded architecture, and/or any other suitable distributed computing architecture.

The cluster environment identifier can reference a duster environment submodule from a set of cluster environment submodules, wherein each duster environment submodule includes cluster environment-specific logic to set up the duster environment for a given job scheduler or resource manager (e.g., SLURM, Torch Elastic, LSF, Lightning, Kubeflow, etc.), but can alternatively include other logic.

Examples of distributed computing architectures that can be supported by different distribution modules can include: communication on a single device (e.g., "SingleDevicePlugin"), communication (e.g., training) with multiple parallel processes (e.g., "ParallelPlugin"), data-parallel training in a single process (e.g., the model is replicated to each device and each gets a split of the data; "DataParallelPlugin"), multi-process single-device training on one or more nodes (e.g., "DDPPlugin"), data-parallel training in a single node with synchronization across multiple nodes (e.g., "DDP2Plugin"), sharded optimizer and/or gradient training using FairScale™ (e.g., DDPShardedPlugin", "DDPSpawnShardedPlugin"), methods to spawn processes and rejoin said processes after training completion (e.g., wherein the processes can be spawned using torch.multiprocessing.spawn( ) or another function call; "DDPSpawnPlugin", etc.), implementation using a specific library (e.g., DeepSpeed™, "DeepSpeedPlugin") or interaction integrations (e.g., distributed training integration, such as Horovod™; "HorovodPlugin"), hardware-specific interactions (e.g., training on a single TPU, "SingleTPUPlugin"; training on multiple TPUs, "TPUSpawnPlugin", using torch_xla.distributed.xla_multiprocessing.spawn( ), etc.), and/or other distributed computing architectures.

In operation, the orchestrator 300 can: receive a request including at least a model module identifier and optionally a hardware module identifier; set up the computing environment by calling a series of standard functions or submodules of the hardware module (e.g., specified in the request or a default hardware module); load the model data (e.g., from data pre-loaded by the model module; load data from a request-specified endpoint; load data using a user-specified dataloader; etc.); configure the optimizer for the model module (e.g., by calling the model module's optimizer submodule); and orchestrate model interaction (e.g., by calling the model module's interaction-specific submodule; by calling a predefined series of model module submodules). The request can optionally include a data source, the model module optimizer, hardware module parameters (e.g., number of machines, such as the number of GPUs), and/or other information.

In variants, the orchestrator 300 can optionally receive a precision module identifier, a distribution module identifier, and/or a cluster environment identifier, wherein setting up the computing environment can further include passing the precision module identifier, the distribution module identifier, and/or a duster environment identifier to the hardware module, wherein the hardware module calls a series of standard functions from the identified precision module, distribution module, and/or duster environment submodule during setup. In this variant, model interaction can optionally include passing the precision module identifier, the distribution module identifier, and/or a cluster environment identifier to the model module, wherein the model module (e.g., the model module's interaction function) calls a series of standard functions from the identified precision module, distribution module, and/or cluster environment submodule during model interaction. Alternatively, the identified precision module, distribution module, and/or cluster environment submodule can be loaded into the orchestrator instance (e.g., assigned to variables within the orchestrator instance and used whenever the variable is called). However, the precision module, distribution module, cluster environment submodule, and/or other components can be otherwise connected to the orchestrator, hardware module, model module, and/or other module.

In a specific example, orchestrating the model training includes: placing the model in train mode (e.g., by calling model.train( ) and enabling gradients); calling the model module's hooks to prepare the training data (e.g., calling on_train_batch_start); calling the model module's training step (e.g., calling "training_step" for the data); clearing the gradients (e.g., by calling "optimizer.zero_grad( )"); executing a backward pass (e.g., by calling ".backward( )"); updating the parameters (e.g., using the optimizer; by calling .step( )); and storing the loss (e.g., by writing the loss to the loss array). In variants, orchestrating the model training can include moving the model weights and/or parameters to the hardware instance (e.g., by the distribution submodule) However, training can be otherwise orchestrated.

All or portions of the orchestrator functionalities can be overridden by the model module's submodules and/or other modules. For example, a model module's training submodule can directly reference a specific hardware module, which can override or bypass the hardware module identified in the request. In a second example, the model module's training submodule can include a different set of training orchestration operations that can be preferentially executed. In a third example, a custom orchestrator submodule (e.g., defining custom orchestration logic) can be used (e.g., specified within an interaction request). However, the orchestrator can otherwise interface with the model module and/or hardware modules.

In one variant, the orchestrator can call or execute a generic orchestrator submodule or function that is specific to the requested model interaction, wherein the orchestrator submodule can call the predefined series of model module and/or hardware module functions.

In a second variant, the orchestrator is specific to the model interaction. In this variant, the system can include: a training orchestrator (e.g., trainer), a validation orchestrator (e.g., validation module, validator, etc.), a testing orchestrator (e.g., testing module, tester, etc.), a prediction orchestrator (e.g., prediction module, etc.), and/or any other suitable orchestrator for any other suitable interaction. Each orchestrator can include the logic for coordinating implementation of the interaction between the model module and the hardware module, and can optionally include hardware setup and/or teardown logic.

However, the orchestrator can be otherwise configured.

The set of hardware modules 400 (e.g., "accelerators") of the system 100 function to isolate hardware-specific code away from the model-specific code, and function to define the logic for interacting with a specific type of hardware. The hardware modules preferably include hardware-specific logic and excludes model-specific logic. However, the hardware modules can be otherwise configured. Examples of hardware-specific logic can include: loading hardware-specific libraries, hardware driver calls (e.g., driver-specific calls), hardware-specific data representations, hardware-specific setup, hardware-specific data communication (e.g., between processes, threads, cores, nodes, etc.), and/or other functionalities. This enables model developers to decouple their models from specific training backends, and frees them from writing (and maintaining) hardware code. Like the model modules, each hardware module can include a set of hardware submodules (example shown in FIG. 3B), wherein each hardware submodule preferably conforms to a standardized submodule (and/or hook) naming convention, wherein the hardware submodules referenced by the standard names have logic specific to the respective hardware. Each hardware module is preferably interoperable with the orchestrator and all (or most) of the modules, but can be otherwise operable.

The system 100 preferably includes a different hardware module 400 for each type of supported hardware, but can additionally or alternatively include a different hardware module for each training schema, coordination schema, or other parameters. In a first variation, each hardware module of the set defines the logic to run a single instance of the hardware, wherein the distribution module defines the logic to coordinate across multiple instances of the hardware. In a second variation, each hardware module of the set defines logic to a different combination of hardware type and multiplicity (e.g., single GPU, multiple GPUs, single CPU, multiple CPUs, etc.), combination of hardware type and coordination method (e.g., DDP, DDP2, etc.), and/or other combination of hardware parameters. However, the hardware modules can be otherwise scoped.

Examples of specific supported hardware can include: one or more central processing units (CPUs), one or more graphics processing unit (GPUs), one or more tensor processing units (TPUs), one or more image processing units (IPUs), high performance computing (HPC), different hardware combinations, different data management schemas (e.g., DP, DDP, DDP2, etc.), and/or other hardware.

Each hardware module can accept a set of standard inputs, which can include: the training instance calling the hardware module, a reference to a user-specified cluster environment (e.g., SLURM, Condor, etc.), the number of machines to use, and/or other parameters.

The hardware module 400 can include a set of standard hardware submodules, each with hardware-specific logic that is executed when the submodule is called. Examples of hardware submodules can include: an initialization submodule with computing environment setup logic (e.g., to set up the duster environment); a setup submodule with custom setup logic (e.g., to find local rank, etc.); a step submodule that defines how a model submodules should be implemented on the hardware (e.g., how datatypes are managed, which hardware-specific calls should be made to the hardware itself, how data should be written to or read from the hardware; etc.); different submodules for training steps, validation steps, test steps, and/or other steps; a barrier step submodule that defines the barrier for the hardware; a tensor synchronization submodule that defines how tensors should be synchronized when reducing metrics across accelerators; and/or any other suitable submodule.

For example, the hardware module can define how to initialize, select, and track specific machines, include logic for managing hardware-specific datatypes. In an illustrative example, the GPU hardware module can include logic for how to track tasks distributed across different GPUS, and manages CUDA tensors allocated on each device. In a specific example, the hardware modules include and execute .cuda( ) and .to( ) calls (e.g., wherein these calls are excluded from the model modules).

However, the hardware modules can be otherwise constructed.

The system 100 can optionally include one or more data modules (e.g., "dataloaders"), which function to encapsulate user-specified data, the data management steps for the data (e.g., downloading steps, processing pipelines), and/or the data transforms for said data. This can function to prepare a dataset for model ingestion. For example, the data modules can split a dataset into training, validation, and/or testing sets, and further subdivide each set into batches. The relationship between the datasets and/or data batches can be: predetermined, user-specified, and/or otherwise determined. The data modules are preferably specific to a dataset and constructed by the user, but can alternatively be specific to the model (e.g., constructed by the model developer), generic, specific to different data preparation methodologies, or otherwise configured. The data can be: from the system, from a third party source (e.g., referenced using an API, URI, etc.), and/or otherwise stored. Like the model modules, each data module preferably conforms to a predetermined submodule (and/or hook) naming convention, wherein the data submodules referenced by the standard names have logic specific to the respective data. In an illustrative example, an exemplary data module includes a data pipeline submodule for processing a specific set of data (e.g., cleaning the data, preparing the data, etc.) that is accessible via the "datapipeline" attribute, wherein both the model weights and the data pipeline are loaded by the model module's forward submodule during inference to enable predictions on unprocessed data. However, the data module can be otherwise constructed.

The system can optionally include one or more data modules

However, the system can include any other suitable set of modules.

Different subsystems and/or modules discussed above can be operated and controlled by the same or different entities. In the latter variants, different subsystems can communicate via: APIs (e.g., using API requests and responses, API keys, etc.), requests, and/or other communication channels.

Figure 5:
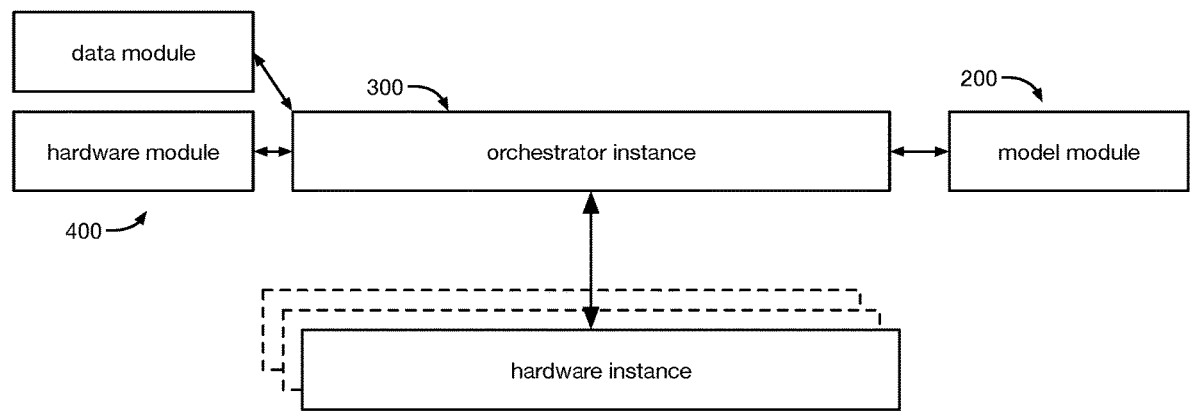
FIG. 5 is an illustrative example of orchestrator instance interaction with the modules, user interface, and hardware instances.
Figure 6:
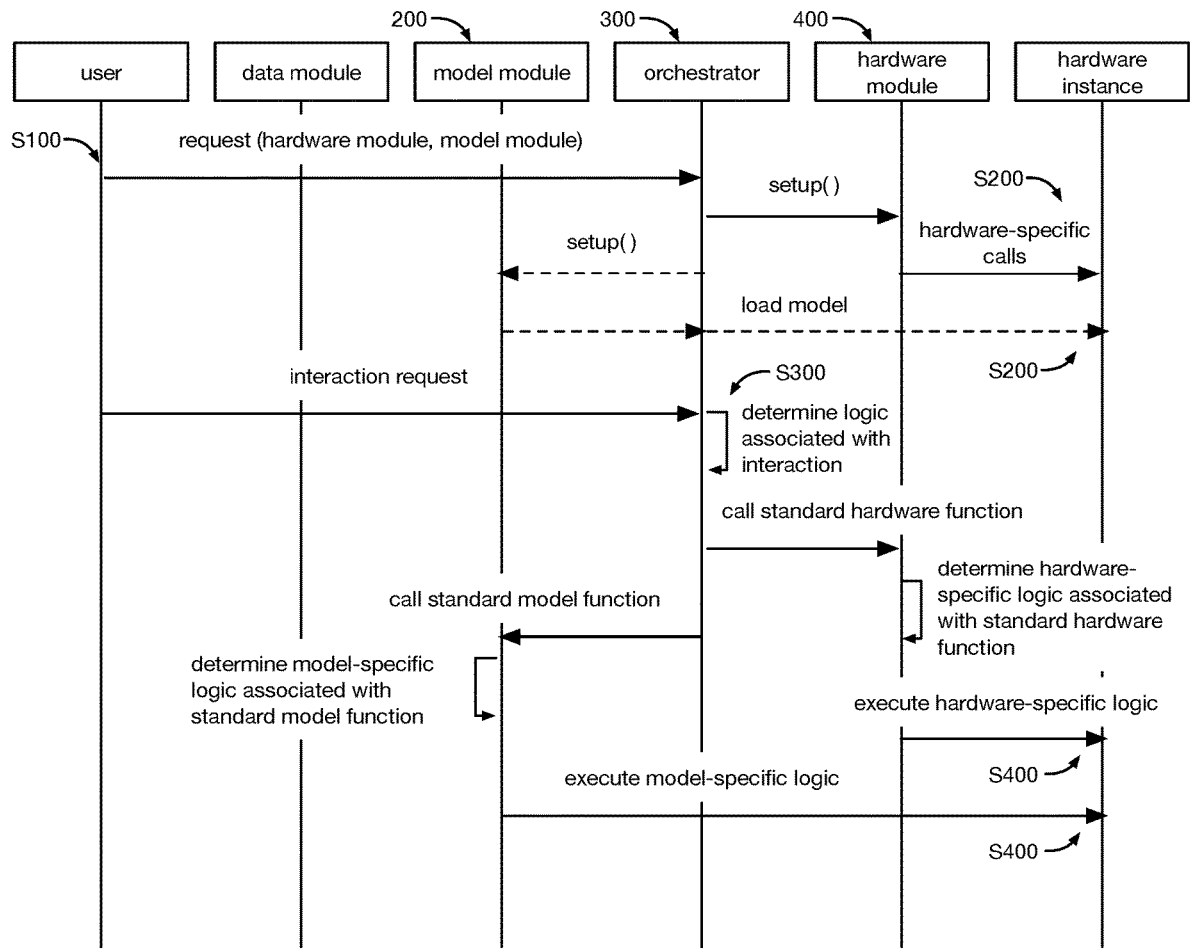
FIG. 6 is an illustrative example of request processing by the orchestrator.

As shown in FIG. 2, example shown in FIG. 5, a method for modular model interaction can include: receiving a model interaction request S100; optionally initializing an instance of the model and an instance of a computing resource using an associated model module and hardware module S200; optionally determining a standard interaction sequence associated with the requested interaction S300; and executing model- and hardware-specific logic by executing standard submodules of the model module and hardware module based on the standard interaction sequence (e.g., using the standard names) S400. Examples of model interaction can include: training, validation, testing, predicting, and/or other model interactions.

The method functions to enable arbitrary models to be executed on arbitrary hardware. In variants, the method further enables arbitrary models to be executed using arbitrary precision, distributed computing schemes, clustering environments, and/or other parameters.

The method is preferably executed using the system 100 as discussed above, but can alternatively be executed using any other suitable system. The method is preferably performed by the orchestrator, more preferably by an orchestrator instance, but can alternatively be entirely or partially be performed by another system, a set of orchestrators, different portions of the different modules, and/or by any other suitable system.

The same method is preferably performed responsive to each request; alternatively, different methods can be performed. For example, different model interactions on different computing resources can be performed using the same series of standard computing resource submodules and the same series of model computing submodules using submodules that share the same name (e.g., submodule name) from different model models and different computing resource modules (e.g., hardware modules).

Receiving a model interaction request S100 functions to specify model interaction parameters. The model interaction request can be received from a user, a third party system, a client, and/or from any other suitable endpoint. The model interaction request can be an API request, a function call (or series thereof), a CLI request, code, a library import, a request submitted through a user interface, and/or otherwise received. One or more requests can be received from one or more requestors, each identifying the same or different combination of model interaction parameters, serially, concurrently, contemporaneously, and/or asynchronously.

The model interaction parameters (e.g., identified in the model interaction request can include one or more: models, computing resources (e.g., hardware), precision(s), distributed computing scheme(s), desired model interactions (e.g., training, validation, testing, prediction, etc.), the dataset, the data loader, and/or other model interaction parameters.

The model interaction parameters are preferably identified by the respective module identifiers, but can alternatively be identified using module hashes, user-assigned names, and/or other identifiers. Additionally or alternatively, the model interaction parameters can be default values (e.g., when the request does not include a value for the model interaction parameters). Each identified model interaction parameter is preferably associated with a predefined module or submodule, but can alternatively be associated with an undefined module or submodule.

In one example, the request includes: a dataset endpoint (e.g., wherein the dataset can be retrieved from the dataset endpoint); a dataloader; a model module identifier; an orchestrator identifier (e.g., for an orchestrator module associated with a model interaction, an orchestrator submodule associated with the model interaction, etc.); model interaction variable values (e.g., number of processing units, learning rates, number of layers, maximum number of steps, batch size limits, etc.); and/or other model interaction parameters.

In an illustrative example, the request can be a CLI request, and include: "train—dataset_identifier—gpus 4 my_model.py-learning rate 'uniform(1e-6, 1e-1, 20)'-layers '[2, 4, 8, 6]'". This request can be parsed to identify: the desired interaction (e.g., "train"), which can be mapped to a predetermined orchestration submodule for the interaction; the dataset identifier ("dataset_identifier"); a hardware module associated with a GPU (e.g., a single GPU, multiple GPUs); optionally a distributed module associated with multiple GPUs; a model module identified by "my_model"; a set of 20 learning rates having a uniform distribution between 1e-6 and 1e-1; and a set of model layers (e.g., 2, 4, 8, and 16). This request can then launch 80 experiments (e.g., 20 learning rates×4 model layers), each running on 4 GPUs, using the data from the identified dataset.

However, the model interaction request can be otherwise received.

The method can optionally include initializing an instance of the model and a set of instances of a set of computing resources using an associated model module and hardware module S200. The model module and hardware module are preferably identified in the request, but can alternatively be default modules or otherwise determined. This is preferably performed or controlled by the orchestrator, but can be otherwise controlled.

Initializing the instance of the model can include: assigning a generic variable value to the model module; loading the model module into the orchestrator's computing environment; loading the model module (or model submodule from the model module) onto the computing resource instance(s); and/or otherwise initializing the model instance.

Figure 7:
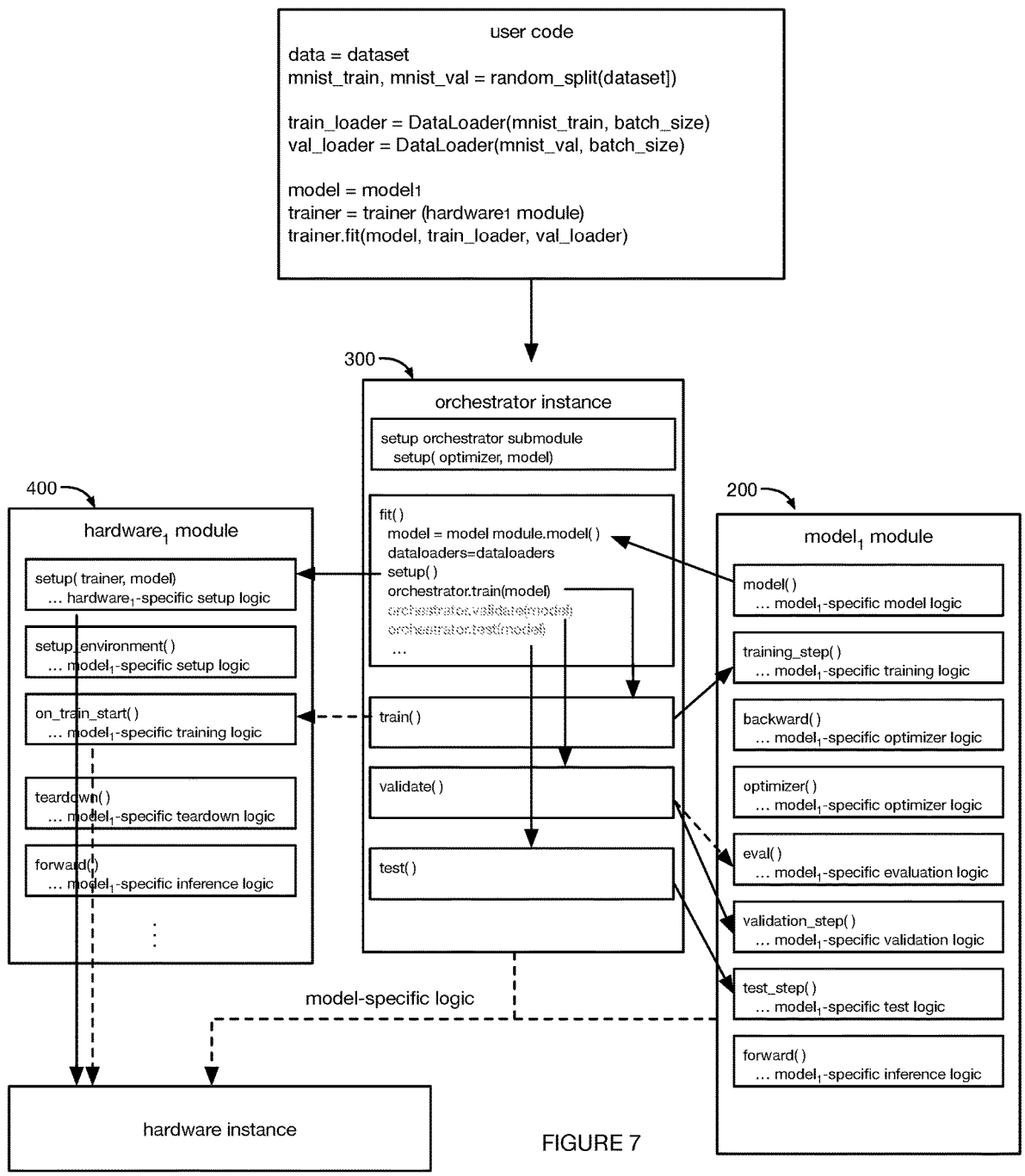
FIG. 7 is an illustrative example of coordination by an orchestrator instance between a user-specified hardware module, model module, and a hardware instance corresponding to the hardware module.

Initializing the computing resource instance(s) can include executing the hardware module (or submodules/functions thereof) associated with the requested computing resource, wherein the orchestration and/or model logic (from the model submodules) can be executed on said computing resource instance (example shown in FIG. 7). The hardware module (or submodules/functions thereof) is preferably executed by the orchestrator instance (e.g., by calling the "setup" function), but can alternatively be executed by a coordinating device or any other suitable device. Initializing the computing resource can include: calling a standard setup submodule from the respective hardware module, and can optionally include determining a precision (or other computational strategy) and/or a distributed computing scheme, and configuring the computing resource instance according to the precision and/or distributed computing scheme using the respective modules (e.g., by executing the precision module and/or distribution module). The precision and/or distributed computing scheme can be: requested in the request, be default values, and/or be otherwise determined.

However, the computing resource can be otherwise initialized.

The method can optionally include determining a standard interaction sequence associated with the requested interaction S300, which functions to specify the series of standard functions (e.g., reserved names) to call from the model module and/or hardware module to implement the requested interaction on the computational resource instances. The standard interaction sequence is preferably determined based on the requested model interaction type, but can alternatively be a generic interaction sequence (e.g., used for all model interaction types) or be any other suitable sequence. For example, a train sequence can be determined for a requested train interaction, a validation sequence can be determined for a requested validation interaction, a test sequence can be determined for a requested test interaction, a prediction sequence (e.g., deployment sequence) can be determined for a requested prediction interaction, a fit sequence (e.g., including a train, validation, and/or test sequence) can be determined for a requested fit interaction, and/or any other suitable sequence can be determined for any other suitable requested model interaction.

This can include initializing an orchestration instance, which functions to create the orchestrator that controls the interactions between the modules associated with the request and defines the interaction-specific sequence of module function calls. A single orchestration instance is preferably initialized for each request; alternatively, multiple orchestration instances can be initialized for a single request. The orchestration instance can be initialized and/or executed on: the hardware specified by the request, a centralized platform, a requesting device (e.g., user device, etc.), and/or on any other suitable computing system. The orchestration instance is preferably initialized before initializing the model instance and/or computational resource instances, but can be initialized at any other suitable time.

In a first variation, the standard interaction sequence is predefined in an orchestration module.

In a first embodiment of the first variation, determining a standard interaction sequence associated with the requested interaction includes: identifying the orchestration module associated with (e.g., specific to) the model interaction identified in the request, and executing said orchestration module.

In a second embodiment of the first variation, determining a standard interaction sequence associated with the requested interaction includes: calling a generic orchestration module and selectively executing an orchestration submodule associated with the model interaction identified in the request.

In a second variation, determining a standard interaction sequence associated with the requested interaction includes: retrieving a standard interaction sequence associated with the requested interaction, and executing the interaction sequence.

However, the standard interaction sequence can be otherwise determined.

Executing model- and hardware-specific logic by executing standard submodules of the model module and hardware module based on (e.g., specified by) the standard interaction sequence (e.g., using the standard names) S400 functions to implement the model interaction. This is preferably performed by the orchestrator instance, but can alternatively be performed by any other suitable computing system.

In a first example, the method can include training a model. This can include: receiving a train request specifying a model; determining a model module associated with the model; determining a hardware module associated with the request (e.g., specified in the request or default hardware module); initializing an orchestrator instance associated with the train request; setting up the computing resources by calling a setup submodule within the hardware module (e.g., including calling precision modules and/or distribution modules specified by the setup submodule and/or the request, etc.); optionally enabling gradients; optionally initializing a loss vector; and training the model by calling a training sequence of standard submodules (functions) from the model module and/or hardware module, wherein the training sequence is defined by the orchestration module or submodule; and optionally shutting down the computing resources (e.g., using a standard submodule associated with hardware-specific logic from the hardware module).

Executing the training sequence can include calling a train submodule within the model module. The train submodule can be called once, wherein the train submodule can define the training loop logic. Alternatively, the train submodule can be iteratively called, wherein the training loop logic is defined by the orchestration module or submodule and the train submodule only defines model-specific logic for a single training loop iteration.

The training loop logic can include optionally determining a loop termination condition (e.g., from the model module, etc.); iteratively: executing a forward pass by passing a training data batch to the training step submodule of the model module, recording the loss, and appending the loss to the loss vector; clearing the gradients; calling a backward pass of the model module; and updating the model parameters until the loop termination condition is met (e.g., no training data batches are left). However, any other suitable training loop logic can be used.

In a second example, the method can include validating the trained model. This can be performed as part of the training logic (e.g., wherein the training logic includes a training loop automatically followed by a validation loop), independent of training, or otherwise performed. This can be performed by the validation orchestrator submodule, the orchestrator module, and/or by another module. Validating the trained model can include: optionally initializing computing resources (e.g., using standard submodules associated with hardware-specific logic from the hardware module); validating the model by calling a validation sequence of standard submodules (functions) from the model module and/or hardware module, wherein the validation sequence is defined by the orchestration module or submodule; and optionally shutting down the computing resources (e.g., using standard submodules associated with hardware-specific logic from the hardware module). The validation sequence can include: optionally disabling gradients, batchnorm, and/or dropout; optionally putting the model instance into an evaluation mode; iteratively: calling the model module's validation step (e.g., defining model-specific validation logic) with each successive validation data batch and storing the result, until no validation data batches are left; optionally reenabling gradients, batchnorm, and/or dropout; and optionally putting the model back into train mode. However, the model can be otherwise validated.

In a third example, the method can include testing the trained model. This can be performed as part of the training logic (e.g., wherein the training logic includes a training loop and/or validation loop automatically followed by a test loop), independent of training, or otherwise performed. This can be performed by the testing orchestrator submodule, the orchestrator module, and/or by another module. Testing the model can include: optionally passing the trained model to the testing orchestrator submodule, wherein the best weights (e.g., associated with the best metrics, such as the highest accuracy, highest precision, lowest loss, etc.) can be automatically loaded by the orchestrator instance; iteratively calling the model module's test step (e.g., defining model-specific testing logic) with each test data batch until no test data batches are left. However, the model can be otherwise tested.

In a fourth example, the method can include performing inference using the trained model. This can include: receiving an inference request specifying the model (e.g., the trained model instance); optionally setting up the computing resources by calling a setup submodule within the hardware module (e.g., including calling precision modules and/or distribution modules specified by the setup submodule and/or the request, etc.); and performing inference using the model instance by calling an inference sequence of standard submodules from the model module and/or hardware module; and optionally shutting down the computing resources. The inference logic can be specified by the model module's inference submodule, an inference-specific orchestrator module or submodule, or by any other suitable module. The inference sequence can include: optionally putting the model instance into an inference or prediction mode; iteratively: calling a model module's inference or prediction step (e.g., forward( ); defining model-specific inference logic) with each successive inference data batch and optionally storing the result, until no inference data batches are left; and optionally shutting down the computing resources (e.g., using a standard submodule associated with hardware-specific logic from the hardware module). However, the trained model can be otherwise used for inference.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system for modular model implementation, comprising:
    a processing system; and
    a non-transitory computer readable medium storing instructions executable by the processing system, the instructions comprising:
        an orchestration module configured to:
            a) receive a set of requests, each identifying a model and a hardware type;
            b) for each request, initialize an instance of the respective model on an instance of the respective hardware type using a model module and a hardware module associated with the model and the hardware type, respectively, wherein the hardware module is selected from a plurality of hardware modules, each associated with a different hardware type; and
            c) execute the same series of standard submodules from each of the respective model modules, wherein each model module defines model-specific logic within each standard submodule.

2. The system of claim 1, wherein the series of standard submodules further comprises standard submodules from each of the respective hardware modules, wherein each hardware module comprises hardware-specific logic within each standard submodule.

3. The system of claim 1, wherein each request is for at least one of a set of a model implementation types, wherein each model implementation type is associated with a different series of standard submodules.

4. The system of claim 3, wherein the model implementation types comprise: training, validating, testing, and prediction.

5. The system of claim 1, further comprising a set of precisions, each associated with a different precision module; wherein a request further identifies a precision from the set; and wherein initializing the respective instance of the hardware type comprises executing the precision module associated with the precision.

6. The system of claim 1, further comprising a set of distributed computing types, each associated with a different distribution module, wherein a request further identifies a distributed computing type from the set, wherein executing the standard submodules comprises:
    allocating data to different hardware types according to the distribution module associated with the distributed computing type; and
    coordinating execution of the standard submodules on the different hardware type according to the distribution module.

7. The system of claim 6, wherein the hardware types comprise at least one of: a central processing unit (CPU), graphics processing unit (GPU), image processing unit (IPU), or tensor processing unit (TPU), and wherein the distributed computing types comprise at least one of: single device, data parallel (DP), distributed data parallel (DDP), or sharded.

* * * * *